United States Patent [19]

Peterson

[11] Patent Number: 4,826,523
[45] Date of Patent: May 2, 1989

[54] GOB DISTRIBUTOR WITH GOB DEFLECTOR

[75] Inventor: George T. Peterson, Bristol, Conn.

[73] Assignee: Emhart Industries, Inc., Farmington, Conn.

[21] Appl. No.: 20,273

[22] Filed: Mar. 2, 1987

[51] Int. Cl.$^4$ ............................................. C03B 7/16
[52] U.S. Cl. ..................................... 65/165; 65/158; 65/159; 65/DIG. 13
[58] Field of Search .................. 65/122, 127, 158, 159, 65/164, 165, DIG. 13

[56] References Cited

U.S. PATENT DOCUMENTS

| | | | |
|---|---|---|---|
| 4,431,436 | 2/1964 | Lylejian ................................. | 65/159 |
| 4,453,963 | 6/1984 | Larson et al. ......................... | 65/159 |
| 4,459,146 | 7/1984 | Farkas et al. .......................... | 65/159 |
| 4,504,301 | 3/1985 | Bystrianky et al. ................... | 65/159 |
| 4,547,211 | 10/1985 | Ananlas ................................. | 65/159 |
| 4,614,531 | 9/1986 | Bishop et al. ......................... | 65/159 |

*Primary Examiner*—Arthur Kellogg
*Attorney, Agent, or Firm*—Spencer T. Smith

[57] ABSTRACT

A gob distributor is disclosed having a deflector which will be operated whenever gobs should be prevented from entering the gob distributor. The deflector is operated by an interceptor valve which is controlled by an air operated four-way pilot valve. A pilot valve maintenance circuit is provided to periodically blow collected water and oil out of the pilot valve. This circuit inlcudes a frequency timer which will periodically operate a solenoid valve and a duration timer which controls the duration of this operation. Means are provided for preventing the operation of these timers beyond selected ranges which assures that any water or oil collected in the pilot valve will be cleared.

2 Claims, 4 Drawing Sheets

GOB DISTRIBUTOR WITH GOB DEFLECTOR

The present invention relates to gob distributors which receive gob from a gob feeder and redirect these gobs to discrete glassware forming stations.

Whenever gobs should not be handled by the gob distributor, a gob interceptor is actuated to advance its deflector or guide from a deliver position where gobs fall into the gob distributor to reject position in the path of the gob to deflect a dropped gob to a cullet chute before it reaches the gob distributor.

The power off position of the deflector is the reject position and an air operated four-way pilot valve shifts the deflector between the deliver and reject positions during normal operation.

The interceptor has been known to fail due to water and oil collecting in the pilot valve. This is very undesirable since an operator's safety is at stake. Efforts have accordingly been made to operate the interceptor once every gob distributor cycle by adjusting operating switches on the timing drum to remove any water and oil from the pilot valve. These prior efforts have not proven successful.

It is accordingly an object of the present invention to provide an improved system for making sure that oil and water will not be collected in the pilot valve, thereby assuring that the interceptor mechanism will operate in the intended manner.

Other objects and advantages of the present invention will become apparent from the following portion of this specification and from the accompanying drawings which illustrate, in accordance with the mandate of the patent statutes, a presently preferred embodiment incorporating the principles of the invention.

Referring to the drawings.

Figure 1:
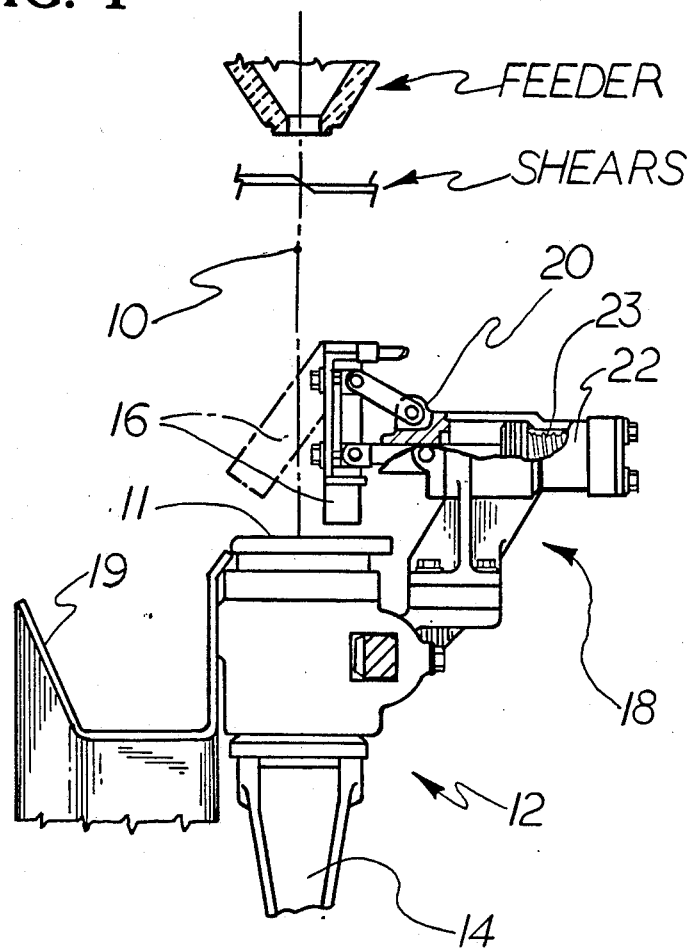
FIG. 1 is an elevational view of a gob distributor.

In glassware forming machines, molten glass is extruded as a continuous runner from a Feeder and is cut into discrete gobs by Shears which are advanced to define a gob having a selected length. The formed gob drops along a gravitational path 10 into the open end 11 of the gob distributor 12 where it is guided to the scoop 14 which redirects the gob to a selected through of an individual glassware forming section (not shown).

To prevent gobs from entering the gob distributor 12, the pivotally supported deflector 16 of an interceptor 18 can be pivoted from a remote deliver position where gobs will fall into the gob distributor to an advanced reject position (shown in phantom) in the path of a gob to deflect gobs into the cullet chute 19 by advancing the rod 20 of the interceptor valve 22. This valve 22 is spring 23 biased to the advanced operative position so that in the event of power loss, the deflector 16 will be advanced to deflect gobs into the cullet chute 19. The interceptor valve 22 is a two-way valve which is operated by an air operated four-way Pilot Valve. In the deflector retracted position pressurized air is supplied to the left end of the interceptor valve 22 to force the valve to the deliver position. Whenever the Controller supplies the Solenoid Valve with an "off" signal, this valve will operate the Pilot Valve to shift the interceptor valve 22 to the reject position.

Figure 2:
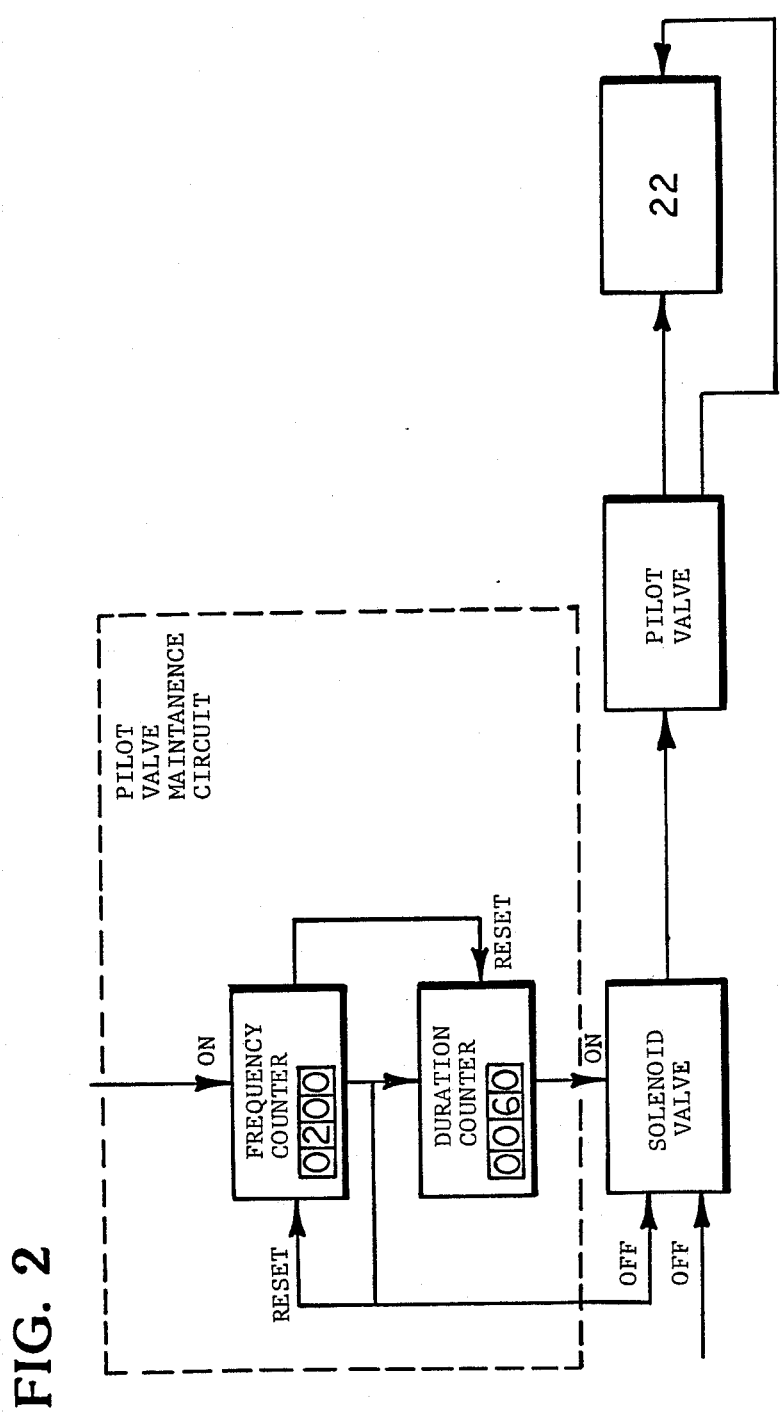
FIG. 2 is a schematic illustration of the interceptor valve control circuit.
Figure 3:
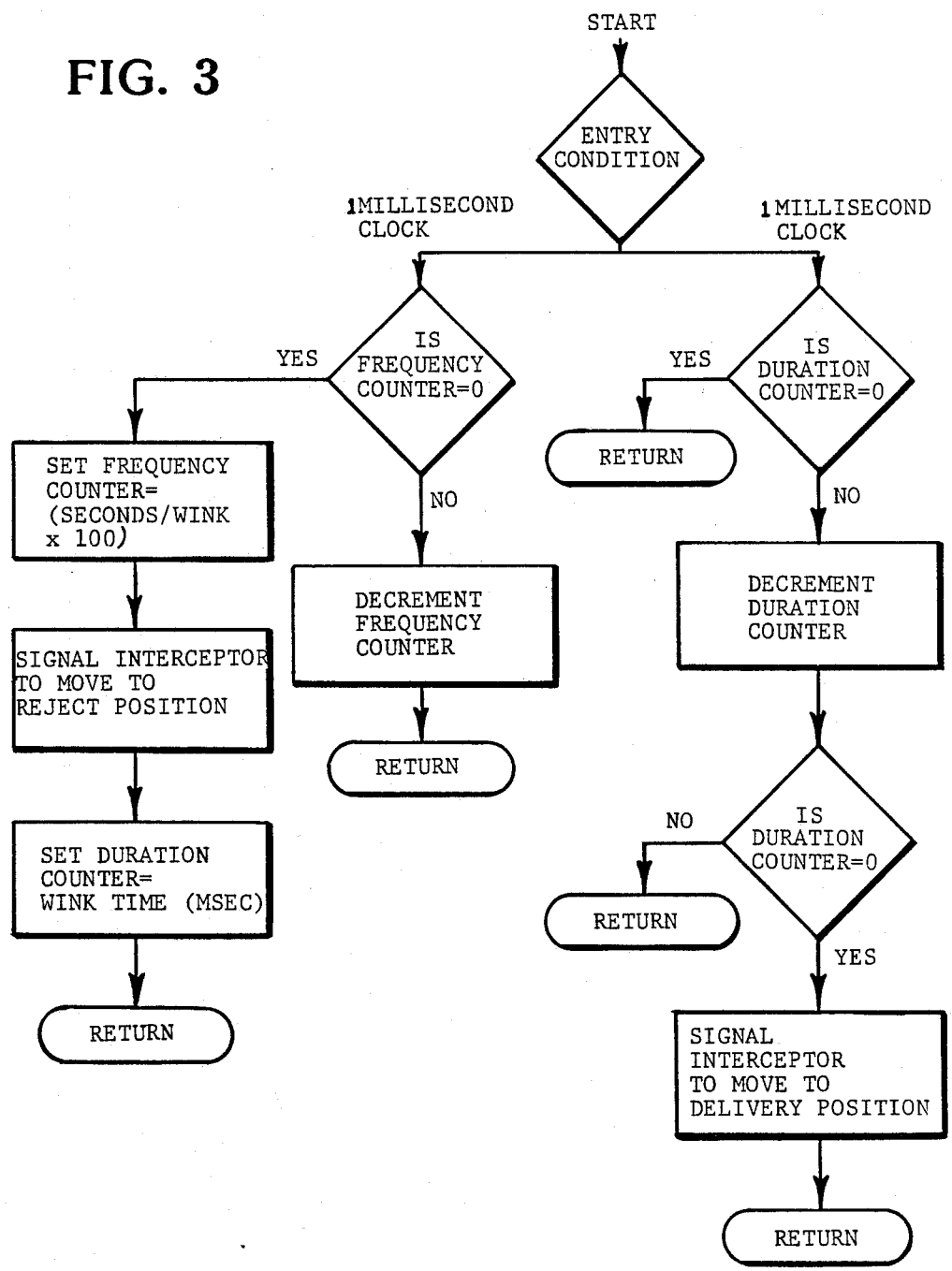
FIG. 3 is a flow chart illustrating the wink timer algorithm.

To momentarily operate the Pilot Valve to blow out any oil or water which may be accumulated, a Pilot Valve Maintenance Circuit is turned on. A Frequency Counter (a timer in a central processing unit) which can be set for a selected count is turned on whenever the gob distributor 12 is cycling and periodically turns on a Duration Counter (a timer in the central processing unit which is also setable). The frequency/duration algorithm is illustrated in FIG. 3. The Frequency Counter is set to the desired count and then decremented to zero whereupon it is reset. Each time the Frequency Counter is reset the Duration Counter is set and the Solenoid Valve is turned off to advance the deflector towards the reject position. When the Duration Counter decrements to zero the solenoid to its delivery position. This advancement of the deflector is commonly referred to as winking and the wink time is set to be small enough so that deflector will not advance far enough to interfere with a falling gob. The frequency count and the duration count are setable by an operator (the digital inputs shown in FIG. 2 represent the digital inputs to a hand held terminal).

Figure 4:
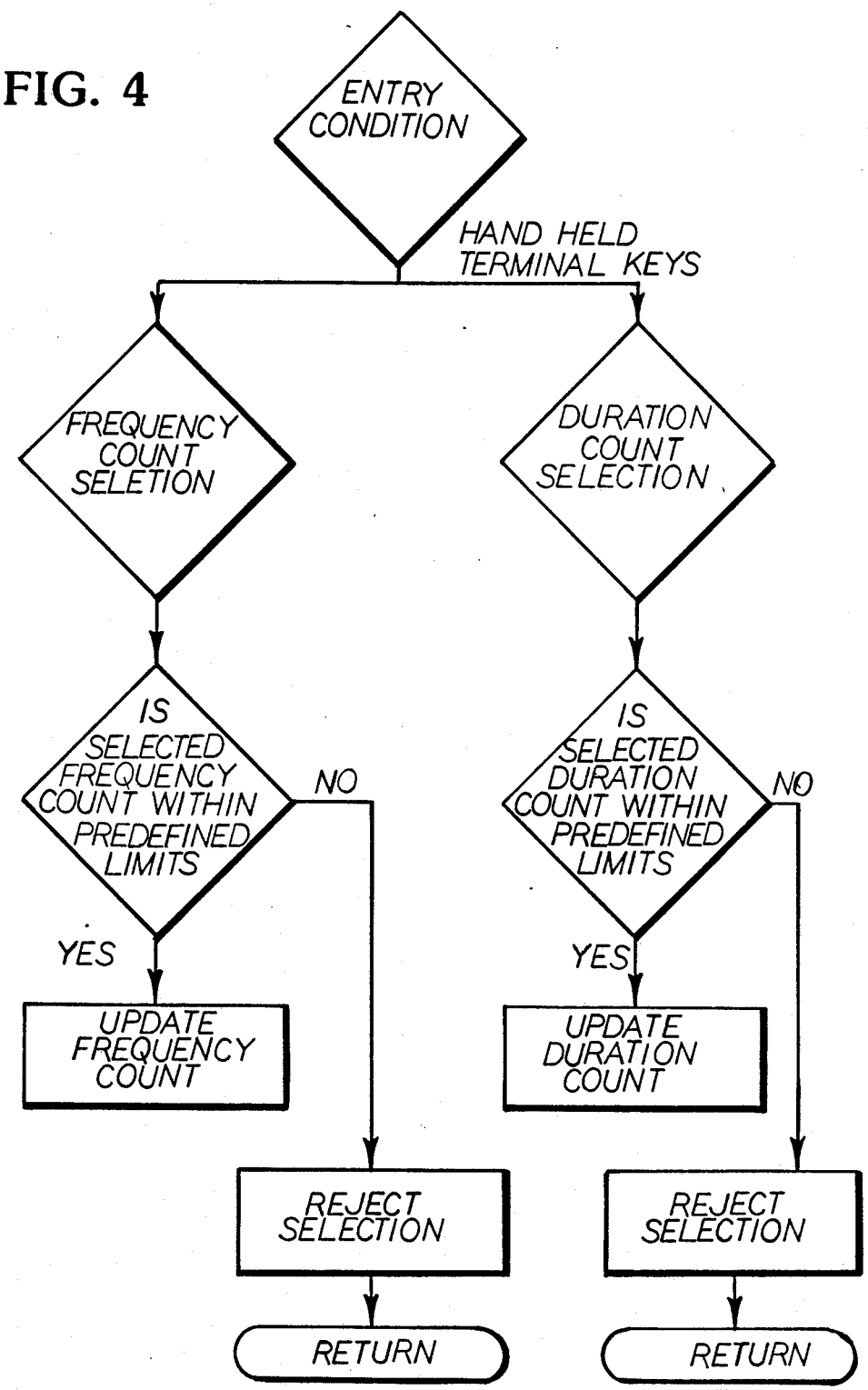
FIG. 4 is a flow chart illustrating the operation of the hand held terminal.

As can be seen from FIG. 4 which illustrates the hand held terminal flow chart, the request count and duration count selected must be within acceptable limits or the Frequency Counter and Duration Counter will remain at their original settings which are within these acceptable limits. These ranges assure that the deflector 16 will "wink" at a frequency and for a duration sufficient to maintain the Pilot Valve in clear condition. This acceptance requirement prevents an operator from disabling the "wink" procedure and makes the winking procedure time rather than cycle dependent.

I claim:

1. A gob distributor comprising
   gob scoop means for receiving a gob and directing the received gob to a glassware forming station,
   a gob deflector,
   means for displacing said gob deflector from a deliver position to a reject position whereat a gob dropping toward said gob scoop means will be deflected away from said gob scoop means including
   interceptor valve means for advancing said gob deflector from said deliver position to said reject position,
   air operated pilot valve means for operating said interceptor valve to advance said gob distributor,
   solenoid valve means for operating said pilot valve means when it is desired to advance said gob deflector, and
   computer means for automatically maintaining said pilot valve means free from oil or water which accumulates when the pilot valve is not operating including
   manually settable duration timer means for operating said solenoid valve for a selected time duration whereby said gob deflector will be displaced from said retracted position, but will not be displaced far enough to reach said reject position,
   means for preventing the manual selection of a duration of time for said duration timer means outside of a predetermined range of time,
   manually settable frequency timer means for operating said duration timer means at a selected frequency, and
   means for preventing the manual selection of a frequency for said frequency timer means at a frequency outside of a predetermined frequency range.

2. A gob distributor according to claim 1 wherein said interceptor valve includes a spring for biasing said deflector to said reject position.

* * * * *